United States Patent [19]

Lee

[11] Patent Number: 4,761,660
[45] Date of Patent: Aug. 2, 1988

[54] LASER SCANNING APPARATUS USING A FAN STYLE GRATING PLATE

[75] Inventor: Charles C. Lee, Little Canada, Minn.

[73] Assignee: Minnesota Mining and Manufacturing Company, St. Paul, Minn.

[21] Appl. No.: 941,777

[22] Filed: Dec. 15, 1986

[51] Int. Cl.⁴ .............................................. H04N 7/18
[52] U.S. Cl. .................................... 346/108; 346/160; 358/293; 250/237 G; 250/237 R
[58] Field of Search ............... 250/235, 237 G, 237 R; 346/108, 160; 358/293, 294, 287

[56] References Cited

U.S. PATENT DOCUMENTS

| | | | |
|---|---|---|---|
| 4,413,270 | 11/1983 | Sprague | 346/160 |
| 4,578,577 | 3/1986 | Noguchi | 358/293 X |
| 4,600,837 | 7/1986 | DiStefano et al. | 358/293 X |
| 4,616,132 | 10/1986 | Kessler | 358/293 X |

*Primary Examiner*—Harold Broome
*Assistant Examiner*—Huan Tran
*Attorney, Agent, or Firm*—Donald M. Sell; Robert L. Marben

[57] ABSTRACT

A laser scanner apparatus using a laser reference beam that is directed to and scans a grating plate which is used for producing a data clock for the apparatus. The grating plate has a line grating formed by a plurality of lines that are equally spaced along the scan of the grating plate by the laser reference beam. The plurality of lines, if extended, intersect at a single point. The grating plate can have more than one such line grating.

5 Claims, 3 Drawing Sheets

LASER SCANNING APPARATUS USING A FAN STYLE GRATING PLATE

BACKGROUND OF THE INVENTION

The invention presented herein relates to a laser scanning apparatus for the production of high resolution microfilm images from electronic data signals such as are available from raster image based electronic image storage systems and, in particular, to such a laser scanning apparatus wherein a resonant scanner is used and a grating clock is utilized to linearize the resonant scanning.

The grating clock approach, which includes the use of a line grating plate with a phase lock loop, has been used for many high resolution laser scanning systems wherein the output resolution is required on the order of 400 dots/centimeter to 4000 dots/centimeter. Examples are laser phototypesetters, high quality business graphic printers, graphic arts recorders and laser publication printers. The grating clock provides synchronization between the scan line movement of the laser beam at the surface of the recording media and the data clock across the entire scan line for excellent linearization of the image along the scan line. This excellent linearization is particularly appreciated when the laser beam is directed to the recording media via a resonant galvanometric mirror wherein the mirror movement is sinusoidal. The gratings as used in the prior art laser scanning systems provide no other function.

There is need in laser scanning apparatus for the production of high resolution microfilm images of engineering drawings of various sizes to provide accurate sizing of the microfilm images so that a copy produced from such microfilm will be the proper size relative to the scale used for the microfilmed engineering drawing. In addition, it is desirable that the images for various standard size engineering drawing be centered within the film presented for imaging via a laser scanner apparatus.

SUMMARY OF THE INVENTION

The present invention provides a very simple and cost effective solution to the desire to provide accurate sizing of microfilm images of engineering drawings produced by a laser scanning apparatus and to the desire for centering of microfilm images of engineering drawings of various sizes produced by laser scanning apparatus. The present invention is embodied in a grating plate having a line grating, the line grating including a plurality of lines defined relative to a reference line wherein the plurality of lines intersect with the reference line at equally spaced points along such reference line with all of the plurality of lines, if extended, intersecting at a single point. In a laser scanning apparatus using the grating plate a laser provides a reference laser beam plus means for directing the reference laser beam to the line grating for movement along a line parallel to the reference line with means provided for moving the grating plate orthogonally of the reference line to selected positions relative to the reference laser beam. The grating plate can be provided with more than one set of such plurality of lines serving to reduce the amount of movement of the grating plate required for positioning the line gratings relative to the reference laser beam. Scanning of the grating lines by the reference laser beam is used to produce signals, which provide an indication of the position of the laser beam in its scan of the grating lines. These signals are usable to generate frequency varied, yet position linearized timing pulses as the data clock to modulate the writing laser of a laser scanning apparatus in accordance with information data signals. The laser scanning apparatus is one in which the scan length of the writing beam and the reference beam are almost identical and closely tracked together. This being the case, the writing length of the writing beam on the recording media used in the laser scanning apparatus can be easily adjusted by moving the scanned grating lines slightly up or down relative to the laser scan to provide fine scaling control. In addition, by moving the grating plate to selected positions image resolution can be varied. Also, by delaying the leading edge of the recording image by a number of grating lines from the point used to signal the start of a scan line it is possible to center the image being recorded in the laser scanning direction.

Use of the various positions at which the grating lines can be scanned is simplified by establishing the grating lines on the grating plate so one line orthogonal to the reference line used to define the line gratings is common to each line grating. This common line can be used to establish a start of scan point for each writing scan of the grating lines by the writing beam.

BRIEF DESCRIPTION OF THE DRAWINGS

The novel features and advantages of the present invention will become more apparent to those skilled in the art after reading the following detailed description which refers to the accompanying drawings in which like elements are designated by identical reference numerals in the various figures and wherein.

DETAILED DESCRIPTION

Figure 1:
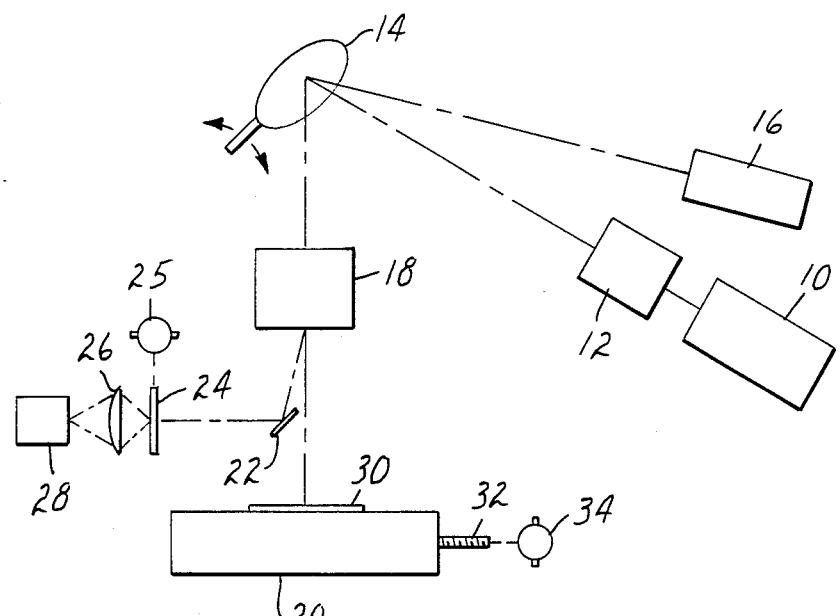
FIG. 1 is a schematic showing of a laser scanning apparatus embodying the invention.

Referring to FIG. 1 of the drawings, a portion of a laser scanning apparatus embodying this invention is shown which includes a writing laser 10, a collimator 12, a resonant galvanometer mirror 14, a reference laser 16, a flat-field lens 18, a platen 20, a fixed mirror 22, a grating plate 24, a lens 26 and a photodetector 28. A receptor or recording film 30 is positioned for exposure on the upper surface of the platen 20 and is held in place by a vacuum produced on the platen side of the film 30.

The writing laser 10 of FIG. 1 is a laser diode and is modulated by signals supplied from control electronics (not shown) to supply a modulated writing beam for imagewise exposure of the film 30. The writing beam is directed by the collimator 12 to the resonant galvanometer mirror 14 which oscillates in a sinusoidal motion to move the writing beam in the "y" direction across the recording film. The galvanometer mirror 14 directs the writing beam to the film 30 via a flat-field lens 18 to focus the beam onto the film 30 throughout its scan across the film 30. scanning of the film 30 in the "x" direction is provided by movement of the platen in the "x" direction. This is carried out by a lead screw 32 that is adapted to be driven by a stepping motor 34, the operation of which is determined by the control electronics (not shown) for the laser apparatus. After each line scan by the writing beam in the "y" direction, the platen 20 is moved in the "x" direction by the motor 34 and lead screw 32 to present a new portion of the film 30 for the next "y" line scan of the film 30 by the writing beam.

The reference laser 16 is a collimated laser diode which has its beam output directed to the galvanometer mirror 14 at a slight angle (about 12°) from the writing beam. It is directed by the mirror 14 for passage through the flat-field lens to the fixed mirror 22 which directs the reference beam to the grating plate 24 where it traverses line gratings present on the grating plate. The line gratings are on the side of the grating plate away from the mirror 22 allowing the space between the line grating and the lens 26 to be enclosed to keep dust particles away from the line gratings. The grating plate 24 is formed from transparent material and has line gratings which can be either the leading edge or trailing edge of opaque, tapered areas formed on the plate 24. The reference beam, when not interrupted by an opaque area on the grating plate, passes to a photodetector 28 via a focusing lens 26. For purposes of the explanation presented herein each grating line is defined by the leading edge of each opaque area, i.e. the first edge of an opaque area traversed by the reference beam as it makes a scan corresponding to a write scan by the writing beam. In the figures provided in the drawing for the grating, only the lines as defined above are shown. The position of the grating plate 24 relative to the reference laser beam is established by the operation of a stepping motor 25 that operatively connected to the grating plate 24 to move it perpendicular to the scan path of the reference laser beam. The apparatus of FIG. 1 is arranged so the scan length of the writing beam and reference beam are almost identical and closely track together. The signals produced by the photodetector 28, as the reference beam passes each opaque area defining a grating line, will provide a measure of the position of the reference beam and the writing beam during each line scan. As in known grating clock arrangements, the output of the photodetector 28 is used with a phase lock loop circuit (not shown) to increase the number of pulse signals from the photodetector by an integral number of times. The pulses produced by this arrangement are used as data clock pulses to time the application of data signals to the writing laser 10 for producing the desired image at the film 30. Such an arrangement is known and is sometimes referred to as the grating clock or grating method for the creation of data clock pulses to strobe data signals for control of the writing laser in a laser scanner.

Figure 2:
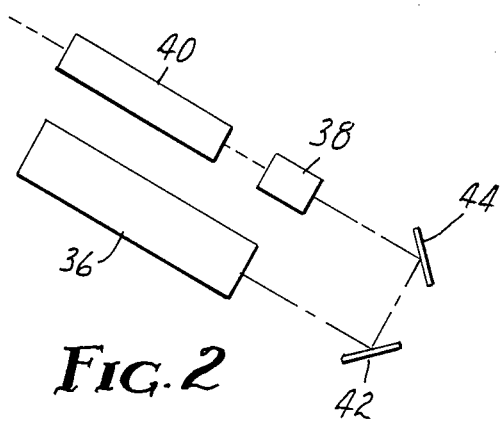
FIG. 2 is a schematic showing of an assembly that can be used in place of a portion of the apparatus of FIG. 1.

Referring to FIG. 2, the assembly shown includes a Helium-Neon laser 36, an acousto-optic modulator 38 for modulating the output of the laser 36 and a zoom type beam expander and iris diaphragm combination 40 for beam size control plus fixed mirrors 42 and 44 to direct the output of laser 36 to provide a more compact assembly. This assembly can be used in the apparatus of FIG. 1 in place of the laser diode 10 and collimator 12.

Prior grating plates that have been used in laser scanning arrangements for the creation of data clock pulses are formed with a number of parallel slits or reflecting portions at a constant pitch which are scanned by the reference clock. The structure for the grating plate 24 differs from that used in the prior art making it possible to accurately size the images produced at the film 30 and readily center the produced image at the film 30 relating to the scanning direction of the writing beam.

Figure 3:
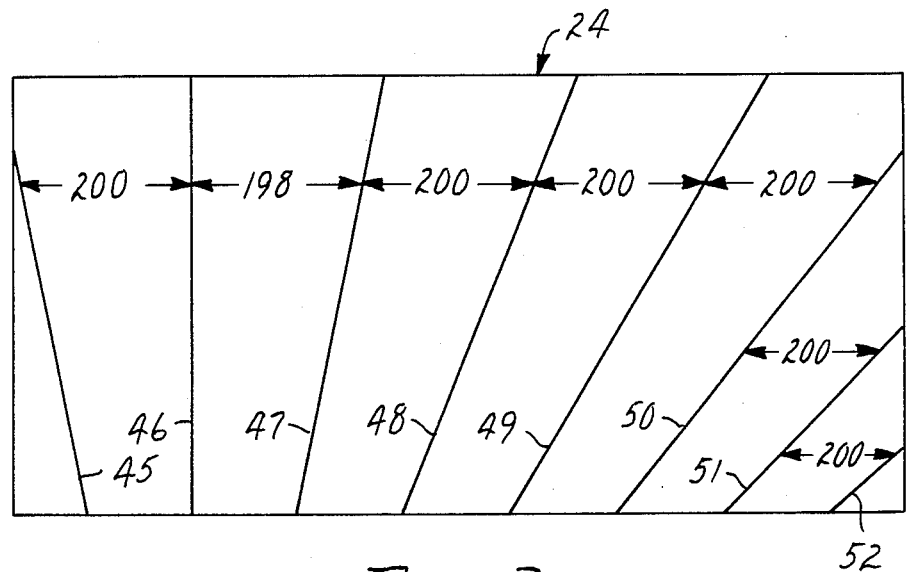
FIG. 3 is a grating plate.

Referring to FIG. 3 of the drawing, one embodiment of a grating plate 24 for use in the apparatus of FIG. 1 is shown as viewed from the side receiving the reference laser beam from the mirror 22. Due to the large number of grating lines presented at the grating plate 24 only one of every 200 grating lines are shown and are identified, beginning with the first one on the left, by reference numerals 45–52. The grating lines are established by use of a reference line wherein the plurality of grating lines, such as lines 45–52, intersect with the reference line at equally spaced points along the reference line. Referring to FIG. 3, the bottom edge of the plate 24 satisfies as a reference line for the explanation given. The grating lines are further defined in that if extended, they all intersect at a point. In the arrangement shown in FIG. 3, such point lies on extension of line 46. Line 46 is selected to be perpendicular to the reference line to provide a convenient reference line common to each position selected for scanning by the reference laser beam. In the structure of FIG. 3, a number of the grating lines to the left of the line 46 are used to provide time for the phase lock loop circuitry (not shown) that receives the output of the photodetector 28 to acquire and lock onto the pulse stream provided as the reference laser beam begins its scan of the grating lines. Only one hundred ninety-eight (198) grating lines are provided in the space from line 46 to line 47 in that the first two lines after line 46 are omitted to define line 46 as the start of scan for a scan line. The end of a scan line is established by keeping a count of the clock pulses that are supplied after the start of scan. The count approach is used since different size images are contemplated to be made at the film 30.

As is apparent from the line grating shown in FIG. 3, the spatial frequencies of the lines and transparent spaces, as well as the dimension of the writing scan length, since it is based on a data clock count, are continuously adjustable depending on where the reference beam traverses the line grating. Since the scanning length of the writing beam and the reference beam are about identical and closely tracked together, a fine adjustment of the writing length on the recording film 30 can be easily made by moving the line grating slightly up or down. The line grating, as described, thus provides fine scaling control for the laser apparatus of FIG. 1.

A grating plate, such as that described in connection with FIG. 3, is particularly useful in a laser scanning apparatus used to produce microfilm images for engineering drawings wherein the microfilm image for a particular standard engineering drawing size must be sized according to the particular reduction ratio associated with the drawing so a drawing when produced in enlarged form from the microfilm image provided by the laser examining apparatus will be the proper size. It is also desirable that the image of the drawing produced at the film 30 be centered on the film.

If the drawing copy that is to be produced from the microfilm image created by the laser scanning apparatus is to have a particular resolution, for example 80 pixels $\times$ 80 pixels per centimeter, resolution of the image to be produced at the film 30 is dependent on the enlargement ratio to be applied to a particular microfilm image to produce the drawing copy. Thus, for example, the microfilm image will be a reduction from an original drawing by a factor of 16 if the enlargement of 16$\times$ is used. Equipment currently in use for making 35 mm microfilm aperture cards of engineering drawings provide reduction ratios of 3×, 24×, 21.2×, 16× and 15×.

An understanding and appreciation of the use of a grating plate 24, prepared as described in connection with FIG. 3, for use in a laser scanner apparatus is provided by the following explanation given with respect to FIG. 4. A grating plate 24 based on the artwork shown in FIG. 4 makes it possible for a laser scanning apparatus, such has been described in connection with FIG. 1, to produce microfilm image of drawings, which when enlarged, can be used to provide an original size copy of the drawing with a particular resolution, for example 80×80 pixels per centimeter. In addition, it provides a simple way for centering of the microfilm image within the film to be exposed by the laser scanner along the scan line of the writing laser beam. For purposes of illustration, it is assumed the microfilm image to be produced is a 30× reduction of a drawing 84 centimeters×120 centimeters. The required microfilm image will be 2.8 centimeters×4.0 centimeters so an enlargement of 30× will provide a copy that is the size of the original drawing.

In terms of a 80×80 pixels per centimeter resolution for the copy of an 84×120 centimeter drawing, drawing copy will have a size 6720 pixels by 9600 pixels. By using a 10× phase lock loop for the grating generator, it is necessary that 672 grating lines are intercepted during the imaging portion of a scan of 2.8 centimeters of the grating. The broken line 62 in FIG. 4 corresponds to the center line for a 35 mm film 30 at the platen 20 of FIG. 1 and is therefore 17.5 mm from and parallel to the start of line (SOL) grating line 63. Since it takes 672 grating lines to travel 2.8 centimeters, center line 62 will intercept the 420th grating line from the SOL 63 (counting the two missing grating lines after SOL 63). The 420th grating line is indicated by the line identified by reference numeral 64.

The scan path for reference laser beam is indicated by the line 65 which is perpendicular to the start of line grating line 63 and passes through the intersection of the 420th grating line 64 and center line 62. In order that the image is centered about the center line 62 a delay corresponding to the travel of 84 grating lines from SOL 63 must be provided before the imaging is begun. This can be readily implemented by the detection of the reference laser beam by the photodetector 28 as it traverses the grating lines. In the example given, the delay would be equal to the time used for the traverse of eighty-four (84) grating lines along the scan of travel indicated by line 65. The two small marks 66 and 67 along the scan path 65 indicate the beginning and end, respectively, of the image portion of a scan. The start of the image indicated at 66 is 336 grating lines to the left of the center line 62, while the end of the image 67 is 336 grating lines to the right of the center line 62.

Considering another size drawing such as one 60×84 centimeters for which a microfilm image is to be produced at the film 30 which, when used to provide a 24× enlargement will provide a drawing that has a 80×80 pixel resolution, the line along which a scan of the grating will be made by the reference laser beam is indicated at 68. Based on the 80×80 pixel resolution, a 60×84 centimeter drawing is 4800×6720 pixels. In this case the microfilm image will be 2.5×3.5 centimeters. It will be necessary to use 480 grating lines for each scan in the 2.5 centimeter direction when a 10× phase lock loop is used, so the center line 62 will intercept the 336th grating line (counting the two missing grating lines mentioned above from the SOL 63). The 336th grating line is indicated by the reference number 69. As before, the intersection of the center line 62 with the 336th grating line 69 establishes a point at which the scan path 68 passes in addition to being perpendicular to the SOL grating line 63. To center the image relative to center line 62, a delay equal to the interception of 96 grating lines is required before the imaging is begun establishing the start of an image at the point 70 on the scan path 68 with the point 71 identifying the end of the image. The point 70 is 240 grating lines to the left of the center line 62 while the point 71 is 240 grating lines to the right of center line 62.

Figure 4:
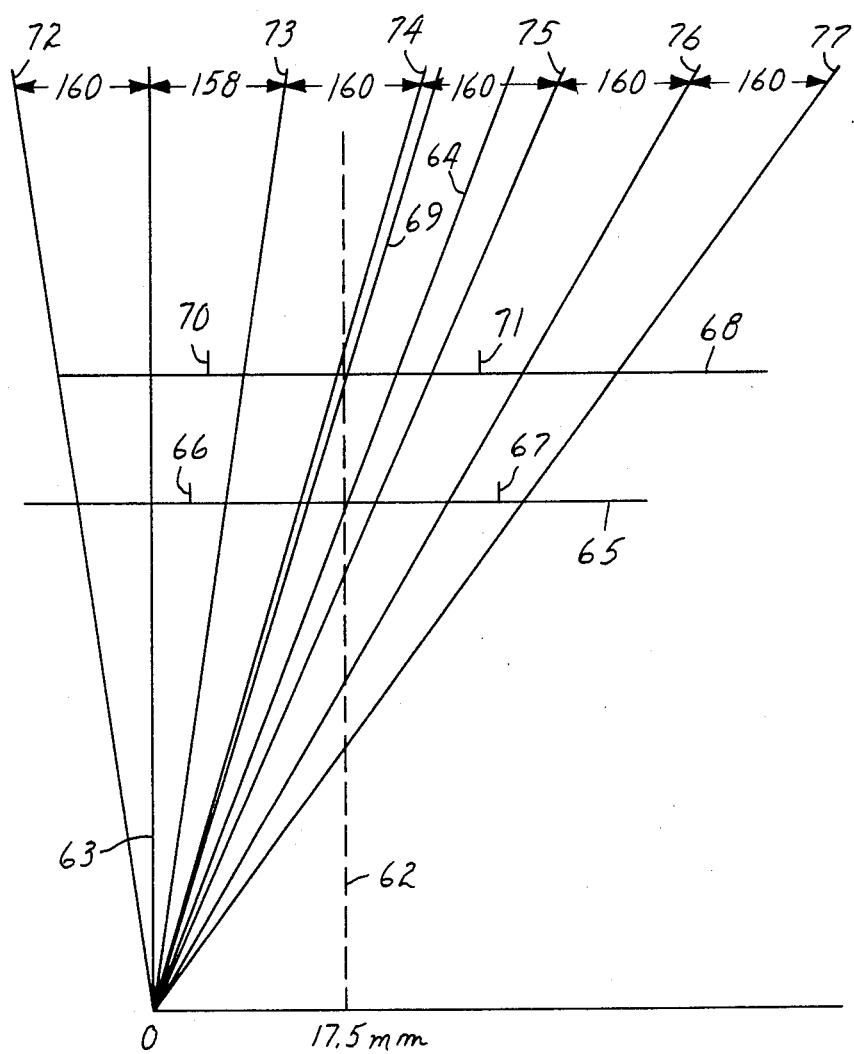
FIG. 4 is artwork for a grating plate.

As in the case of FIG. 3, the grating line layout shown in FIG. 4 does not show all the grating lines. In addition to grating lines 63, 64 and 69, only grating lines 72–77 are shown. The number of lines between 72 and 63, 63 and 73, 73 and 74, 74 and 75, 75 and 76 plus 76 and 77 are indicated on FIG. 4. As for SOL 46 in FIG. 3, any line drawn perpendicular to the SOL 63 in FIG. 4 is intercepted by grating lines at equally spaced apart points. As in FIG. 3, the first two grating lines following the SOL 63 are omitted to provide an indication of the case of line 63 to signal the start of line for a scan made by the reference laser beam.

Figure 5:
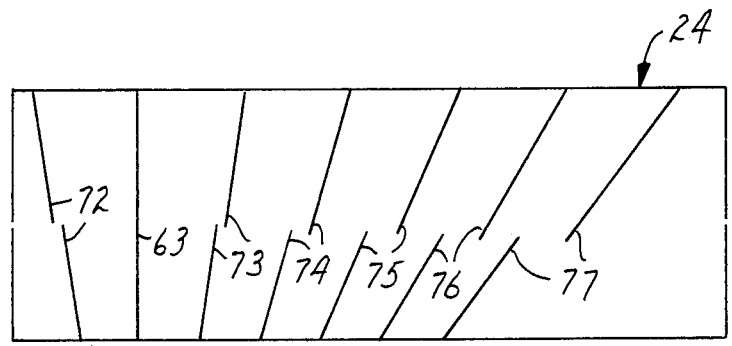
FIG. 5 is a grating plate based on FIG. 4.

A grating plate 24, when made per the description given in connection with FIG. 4, which includes the two scan positions that have been described, can be used in the apparatus of FIG. 1 and would be positioned via the motor 25 to present the desired portion of the grating to be scanned such as the two examples given in FIG. 4. It can be appreciated that other scan lines can be determined for other drawing sizes and for other resolutions that may be required. The size of the grating in the vertical direction can, of course, be reduced since there are areas between the portions to be scanned that are not used which can be eliminated. This arrangement is illustrated by the grating shown in FIG. 5 which is a reduction of a grating plate per FIG. 4, but with the two scan paths defined in connection with FIG. 4 retained.

The movement of the platen 20 by the stepping motor 34 via the lead screw 32 provides for the movement of the film 30 after each scan by the writing laser beam with such movement providing the required resolution of the image in the "x" direction. The platen 20 can, of course, be positioned according to the image size to be produced to provide for the centering of the film image in the "x" direction.

The particulars of the foregoing description are provided merely for purposes of illustration and are subject to a considerable latitude of modification without departing from the novel teachings disclosed therein. For example, while the grating plate 24 described is made from light transmitting material, it can be made with a reflective surface on which non-reflective areas are placed to define the line grating. Using such a structure the reference laser beam is directed to the plate 24 at an angle for reflection with the photocell 28 and lens 26 positioned to receive reflected rather than transmitted light.

I claim:

1. A grating plate having a line grating, the line grating including a set of a plurality of lines defined relative to a reference line wherein said plurality of lines intersect with the reference line at equally spaced points along such reference line, all of said plurality of lines, if extended, intersecting at a single point and a line that is orthogonal to said reference line and spaced at a distance from said set that is greater than the distance between two adjacent lines of said set measured along said reference line.

2. A laser scanner apparatus including:

a grating plate having a line grating, the line grating including a set of a plurality of lines defined relative to a reference line wherein said plurality of lines intersect with the reference line at equally spaced points along such reference line, all that is of said plurality of lines, if extended, intersecting at a single point and a line orthogonal to said reference line and spaced at a distance from said set that is greater than the distance between two adjacent lines of said set measured along said reference line;

a laser for providing a reference laser beam; and means for directing said reference laser beam to said lens grating for movement along a line parallel to said reference line.

3. A laser scanner apparatus in according with claim 2 and further including:

means for moving said grating plate orthogonally of said reference line to selected positions relative to said reference laser beam.

4. A laser scanning apparatus according to claim 3 wherein said grating plate includes at least one additional set of a plurality of lines which is positioned above said first-mentioned set and the lines of which, if extended, intersect at another single point and intersect said reference line at equally spaced points along such reference line and said line that is orthogonal to said reference line providing the only line common with said first-mentioned set of a plurality of lines and said additional set of a plurality of lines.

5. A grating plate according to claim 1 wherein said grating plate includes at least one additional set of a plurality of lines which is positioned above said first-mentioned set and the lines of which, if extended, intersect at another single point and intersect said reference line at equally spaced points along such reference line and said line that is orthogonal to said reference line providing the only line common with said first-mentioned set of a plurality of lines and said additional set of a plurality of lines.

* * * * *

UNITED STATES PATENT AND TRADEMARK OFFICE
CERTIFICATE OF CORRECTION

PATENT NO. : 4,761,660

DATED : August 2, 1988

INVENTOR(S) : Charles C. Lee

It is certified that error appears in the above-identified patent and that said Letters Patent is hereby corrected as shown below:

Column 2, line 64, change "scanning" to read --Scanning--.

Column 5, line 1, change "3X" to read --30X--.

Signed and Sealed this

Third Day of January, 1989

Attest:

DONALD J. QUIGG

Attesting Officer

Commissioner of Patents and Trademarks